(12) United States Patent
Theusner

(10) Patent No.: US 8,157,194 B2
(45) Date of Patent: Apr. 17, 2012

(54) METHOD FOR SEPARATING UNVULCANIZED RUBBERIZED STEEL CORD MATERIAL FOR TIRES

(75) Inventor: Martin Theusner, Gehrden (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 13/016,112

(22) Filed: Jan. 28, 2011

(65) Prior Publication Data

US 2011/0127361 A1    Jun. 2, 2011

Related U.S. Application Data

(63) Continuation of application No. PCT/EP2009/053725, filed on Mar. 30, 2009.

(30) Foreign Application Priority Data

Jul. 31, 2008   (DE) .......................... 10 2008 035 963

(51) Int. Cl.
*B02C 19/00* (2006.01)
(52) U.S. Cl. ...................................... 241/24.17; 241/22
(58) Field of Classification Search ............... 241/24.17, 241/24.27, 22
See application file for complete search history.

(56) References Cited

U.S. PATENT DOCUMENTS

2006/0076276 A1    4/2006   Okamura et al.

FOREIGN PATENT DOCUMENTS

| DE | 10 2005 033 734 A1 | 1/2007 |
| EP | 1 344 566 A2 | 9/2003 |
| JP | 2001226519 A | 8/2001 |

OTHER PUBLICATIONS

Drozdovskii V F: "Grinding of Rubber-Containing Waste Materials and Properties of Commumuted Vulcanisates" International Polymer Science and Technology, Rapra Technology, Shrewabury, GB, vol. 20, No. 8, Jan. 1, 1993, pp. T64-T70, XP000413778 ISSN: 0307-174X.
International Search Report of PCT/EP2009/053725, Dated Jul. 17, 2009.

*Primary Examiner* — Mark Rosenbaum
(74) *Attorney, Agent, or Firm* — Laurence A. Greenberg; Werner H. Stemer; Ralph E. Locher

(57) ABSTRACT

A method separates a rubber material and a steel chord material in tires, tire blanks and carcasses from one another in a simple manner. In the method, rubberized steel chord is fed to a separating device. Then a powdered separating material is fed to the separating device. The steel chord and the rubber are separated by way of interactions between rotating tools and the separating material in the separating device. The separated rubber particles are encapsulated by the separating material. The rubber particles are discharged from an opening in the separating device.

12 Claims, 2 Drawing Sheets

METHOD FOR SEPARATING UNVULCANIZED RUBBERIZED STEEL CORD MATERIAL FOR TIRES

CROSS-REFERENCE TO RELATED APPLICATION

This application is a continuation, under 35 U.S.C. §120, of copending international application No. PCT/EP2009/053725, filed Mar. 30, 2009, which designated the United States; this application also claims the priority, under 35 U.S.C. §119, of German patent application No. DE 10 2008 035 963.7, filed Jul. 31, 2008; the prior applications are herewith incorporated by reference in their entirety.

BACKGROUND OF THE INVENTION

1. Field of the Invention

The invention relates to a process for separating unvulcanized rubberized steel cord material for tires.

Production of tires by all tire producers worldwide produces rubberized steel cord waste, and also carcasses and green tires which hitherto either have to be sent to landfill or, to a small extent, are comminuted by shredders and utilized together with other forms of waste to produce energy in the cement industry. All tire producers have the problem of disposal or recycling of the unvulcanized steel cord waste, and also carcasses and green tires. The main current prior art solutions is landfills and also the comminution of relatively small amounts of rubberized steel cord waste with subsequent utilization to produce energy in the cement industry. Comminution in shredders causes a very large amount of wear of the shredder blades, because the steel cord is very strong, and this makes the process very expensive; the steel cord can moreover very easily become entangled in the shredder apparatuses, with resultant disruption of operations.

SUMMARY OF THE INVENTION

It is accordingly an object of the invention to provide a method for separating unvulcanized rubberized steel cord material for tires which overcome the above-mentioned disadvantages of the prior art methods and devices of this general type, which can separate the rubberization and the steel cord material from one another in a simple manner.

The method separates the rubber material and the steel chord material in tires and tire blanks and carcasses from one another in a simple manner. In the method, rubberized steel chord is fed to a separating device. Then a powdered separating material is fed to the separating device. The steel chord and rubber are separated by way of interactions between rotating tools and the separating material in the separating device. The separated rubber particles are encapsulated by the separating material. The rubber particles are discharged from an opening in the separating device.

A particular advantage of the invention is that the process of the invention can separate unvulcanized rubberization and steel cord material from one another in a simple manner. The rotating tools and the separator to be added bring about effective separation to give separated rubberization particles and the corresponding steel cord material. The separator here leads to encapsulation of the separated rubberization particles, and these can be discharged in a simple manner by way of an aperture in the separation apparatus. The process of the invention thus permits industrial-scale separation and, respectively, recycling of unvulcanized rubberized steel cord waste, for example that arising worldwide in the tire industry.

This process can separate large amounts of steel cord waste into rubberization and steel cord in a single operation, thus permitting recycling.

In one advantageous embodiment of the invention, the density of the pulverulent separator is lower than that of the steel cord material. A result of the low density of the separator is that the separator is easily fluidized, and this promotes the process of separation between the steel cord material and the rubberization.

In another advantageous embodiment of the invention, the separators are polyurethane powder, talc, chalk, sawdust, or other pulverulent separators which can encapsulate the separated rubberization particles because they adhere to the surface of these. These named materials have proven in experiments to be a particularly effective separator. Talc is widely used as antitack material in the tire industry. Reuse within the tire industry is therefore possible.

In another advantageous embodiment of the invention, the amount of the separator added to the separation apparatus is up to 20 percent by weight of the rubberized steel cord material requiring separation. This type of mixing ratio achieves effective separation, as has been demonstrated by experiments.

In another advantageous embodiment of the invention, the rotating tools are chains. Rotating chains are particularly effective comminuting tools. The chains can moreover be used in combination with steel bars/tools.

In another advantageous embodiment of the invention, the chains rotate at a rotation rate of from 350 to 750 rotations per minute. These rotation rates achieve effective separation between the steel cord material and the rubberization, because the mixture has adequate dynamic stiffness. The result is that the rubberization splits away from the steel cord.

In another advantageous embodiment of the invention, the separation apparatus is a drum chipper. This type of drum chipper requires only a few design changes in order to be effective for the process of the invention.

In another advantageous embodiment of the invention, the rubberized steel cord material is reject material arising during tire production. The tire industry has a particular interest in recycling waste of this type effectively in a simple manner, in order to avoid landfill.

In another advantageous embodiment of the invention, the rubberized steel cord material is added in uncomminuted form to the separation process in the separation apparatus. Separation of the uncomminuted rubberized steel cord material is more effective than that of precomminuted steel cord material, as has been demonstrated by experiments.

In another advantageous embodiment of the invention, the steel cord material is discharged from the separation apparatus after separation from the rubberization.

Other features which are considered as characteristic for the invention are set forth in the appended claims.

Although the invention is illustrated and described herein as embodied in a method for separating unvulcanized rubberized steel cord material for tires, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
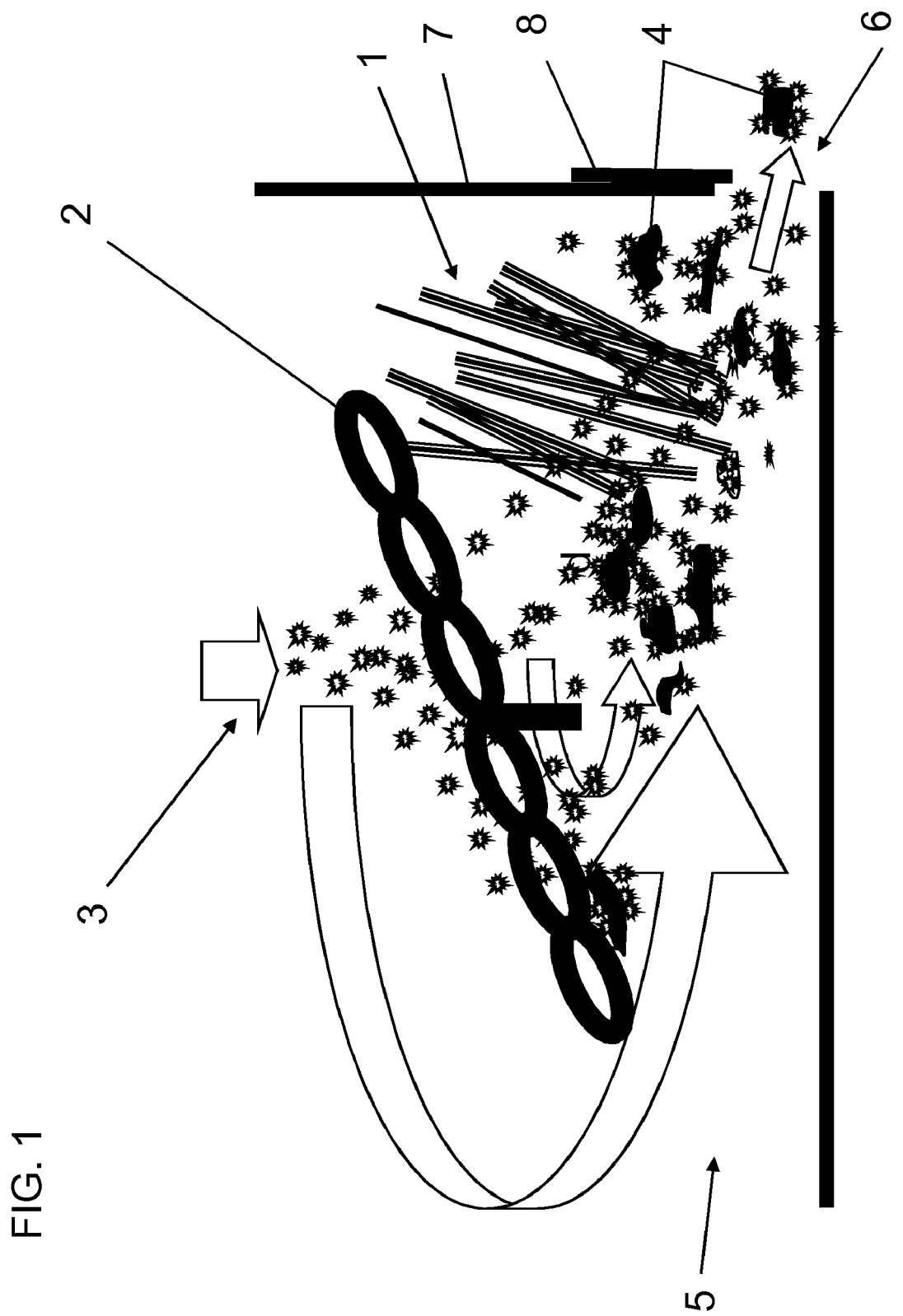
FIG. 1 is a diagrammatic illustration for explaining a process according to the invention.

Referring now to the figures of the drawing in detail and first, particularly, to FIG. 1 thereof, there is shown a process according to the invention. A rubberized steel cord material 1 is introduced by way of an aperture into a drum 7 of a separation apparatus 5. A pulverulent separator 3 is likewise added to the separation apparatus 5. Chains 2 shown diagrammatically rotate at a high rotation rate and thus cause comminution of the rubberized steel cord material 1. In the comminution process, the rubberized steel cord material 1 is separated into rubberization particles 4 encapsulated by the separator, and uncoated steel cord material. The separator 3 becomes fluidized in the drum 7 and encapsulates the separated rubberization particles. The rubberization particles 4 encapsulated by the separator are conducted out by way of an aperture 6 in the separation apparatus, where the aperture is opened by way of a discharge valve 8. After the separation process in the separation apparatus 5, the uncoated steel cord material is conducted out of, or removed from, the separation apparatus (drum chipper).

The rubberized steel cord waste or, respectively, the steel cord material 1 requiring separation is rubberized steel cord or else the carcass material and belt material used in the tire industry. In contrast to the products and, respectively, waste used until now for comminution in the recycling industry, the rubberization is plastic. It is therefore not possible to comminute the products by breaking at room temperature as can be done with solid nonplastic products. When the rubberized steel cord waste 1 is added in a process according to FIG. 1, the amount of energy introduced into the mixture by the effect of impacts of the rotating chains 2 is sufficient that the mixture becomes heated within seconds so that the mixture forms accumulations or clumps around the steel cord, with no separation.

In order to obtain separation, it is necessary to add pulverulent separators 3, such as polyurethane powder, talc, chalk, sawdust, or other pulverulent separators, which encapsulate the separated rubberization particles, as has been demonstrated in experiments.

The amount of separator to be used can be up to 20 percent by weight of the rubberized steel cord requiring separation.

Figure 2:
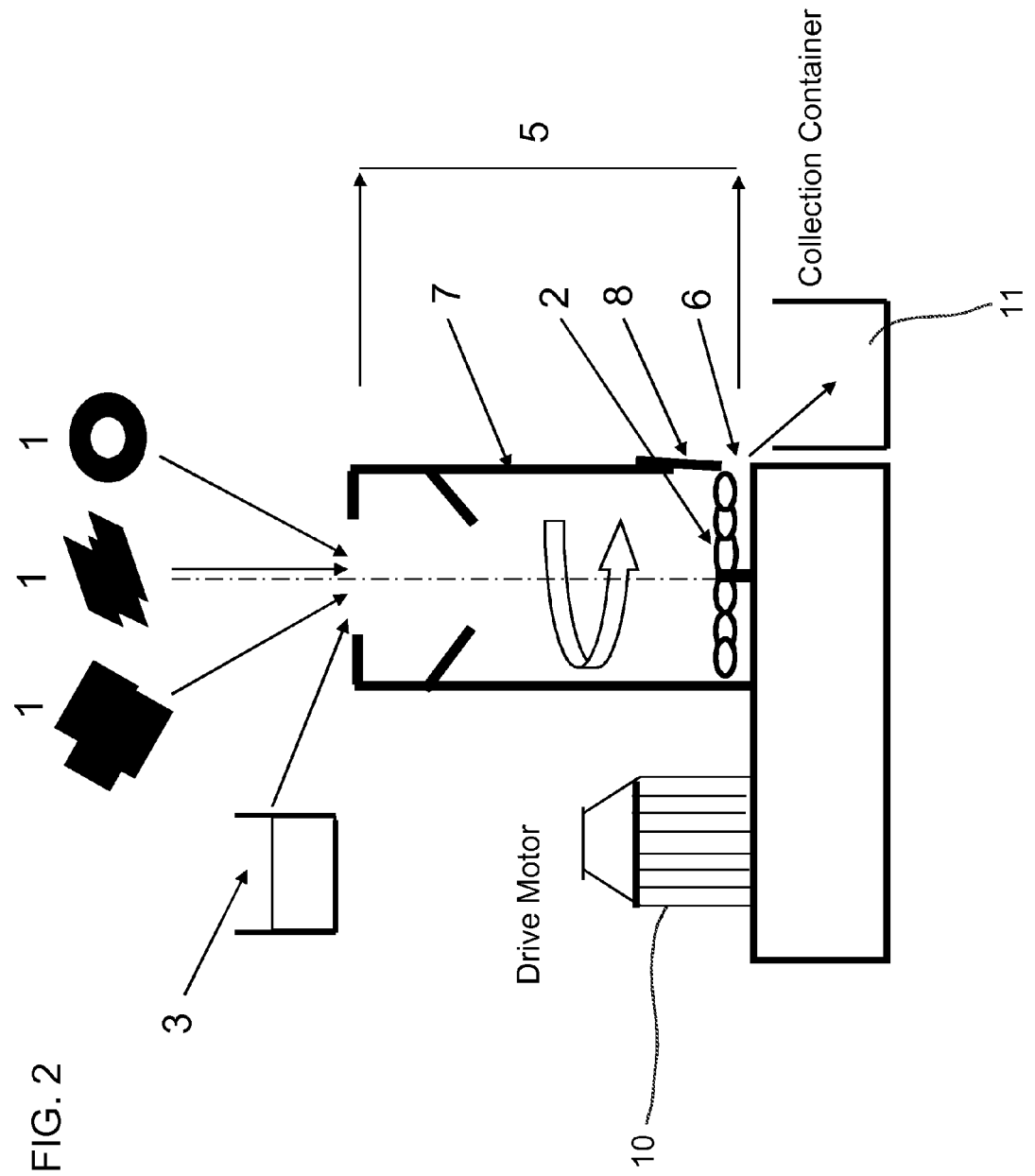
FIG. 2 is a diagrammatic illustration of an apparatus for conducting the process.

The separation apparatus to be used is advantageously a conventional drum chipper, as shown in FIG. 2.

In contrast to the use of the drum chipper for nonplastic products, where the separation of the fragments to give the individual raw-material fractions is delayed until the material is outside the comminutor, separation to give rubberization and steel cord is achieved while the material is in the drum 7. The comminutor here therefore functions as a separation system.

Specifically, the separation mechanism proceeds as follows in the separation apparatus 5.

The impact of the chains 2 releases mixture particles or, respectively, rubberization particles from the steel cord, by virtue of their dynamic stiffness. If no pulverulent separator 3 capable of fluidization in the drum 7 is concomitantly added to the separation apparatus 5, the effect of further impacts of the chains is that the mixture particles either clump with other mixture particles likewise separated, or that the mixture particles individually or in the form of clumps of mixture are redeposited on the steel cord. Clumping of the separated mixture particles can only be achieved via separators 3 that can easily be fluidized in the drum, since these encapsulate the separated, fluidized mixture particles on all sides. The mixture particles or, respectively, rubberization particles 4 covered with separator 3 are then discharged from the separator apparatus 5 after about 30-60 seconds, under the discharge valve 8, which has been opened only sufficiently to provide a slot. These particles are collected in a box. The uncoated steel cord from which all of the rubberization has been removed after about 1 minute, is removed from the separation apparatus 5, or is discharged by centrifugal force at an aperture not shown of the separation apparatus 5. Rock flour or other powders with high density have little effectiveness as a separator, since they are fluidized only to a small extent in the chamber of the separation apparatus 5, and mainly remain on the base, as has been demonstrated by experiments.

If the size of the comminuted steel cord waste used in the drum chipper is about that of the palm of the hand, no separation into the individual components, or only inadequate separation into the individual components, takes place. The resistance of the comminuted steel cord waste is too small to separate the rubberization, since this waste becomes fluidized in the drum 7 and can therefore escape from the chains 2 and thus from any impact.

FIG. 2 shows the type of drum chipper that can advantageously be used for the process of the invention. The rotating chains 2 have been arranged in the drum 7 of the drum chipper and rotate at high rotation rate and are utilized as comminution tool. The drive supplied by way of a drive motor 10. One of the two fractions removed by separation is collected in the collection container 11.

In order to obtain an automated batch process, a discharge shutter 6 on the drum chipper shown has to be enlarged in such a way that the balled accumulations of uncoated steel cord produced by the impacts of the chains 2 can be discharged.

The process described, using a pulverulent separator, has been used until now only for unvulcanized, plastic steel cord waste. In principle, the process can be used for separation with any composite substances where metallic supports are present in a combination with a plastic material in the form of a component.

The invention claimed is:

1. A process for separating unvulcanized rubberized steel cord material, which comprises the steps of:
    introducing the unvulcanized rubberized steel cord material into a separation apparatus;
    introducing a pulverulent separator into the separation apparatus;
    separating steel cord material and rubberization particles from the unvulcanized rubberized steel cord material via an interaction of rotating tools with the pulverulent separator in the separation apparatus;
    fluidizing the rubberization particles and the pulverant separator in the separation apparatus by the interaction with the rotating tools;
    encapsulating separated rubberization particles with the pulverulent separator fluidized in the separation apparatus; and
    discharging the rubberization particles independent of the steel cord material from an aperture in the separation apparatus.

2. The process according to claim 1, which further comprises forming the pulverulent separator with a density lower than that of the steel cord material.

3. The process according to claim 1, which further comprises selecting the pulverulent separator from the group consisting of a polyurethane powder, talc, chalk, and sawdust, the pulverulent separator encapsulating the separated rubberization particles by adhering to a surface of the separated rubberization particles.

4. The process according to claim 1, which further comprises adding an amount of the pulverulent separator to the separation apparatus of up to 20 percent by weight of the unvulcanized rubberized steel cord material requiring separation.

5. The process according to claim 1, which further comprises providing chains as the rotating tools.

6. The process according to claim 5, which further comprises rotating the chains at a rotation rate of from 350 to 750 revolutions per minute.

7. The process according to claim 1, which further comprises providing a drum chipper as the separation apparatus.

8. The process according to claim 1, wherein the unvulcanized rubberized steel cord material is reject material in a form of steel cord waste, green tires and carcasses, formed during tire production.

9. The process according to claim 1, which further comprises during the separating step, adding the unvulcanized rubberized steel cord material in uncomminuted form to the separation apparatus.

10. The process according to claim 1, which further comprises removing the steel cord material from the separation apparatus after separation from the rubberization particles.

11. The process according to claim 1, which further comprises conducting the steel cord material out through an aperture in the separation apparatus after separation from the rubberization particles.

12. The process according to claim 1, wherein the pulverulent separator is introduced into the separation apparatus separate from the unvulcanized rubberized steel cord material.

* * * * *